United States Patent
Vierke et al.

(10) Patent No.: US 9,976,365 B2
(45) Date of Patent: May 22, 2018

(54) APPARATUS TO SUPPORT A TUBULAR MEMBER

(71) Applicant: Forum B + V Oil Tools GmbH, Hamburg (DE)

(72) Inventors: Andre Vierke, Hamburg (DE); Arno Gruess, Hamburg (DE); Frederik Stoldt, Hamburg (DE)

(73) Assignee: FORUM B + V OIL TOOLS GMBH, Hamburg (DE)

( * ) Notice: Subject to any disclaimer, the term of this patent is extended or adjusted under 35 U.S.C. 154(b) by 36 days.

(21) Appl. No.: 15/174,481

(22) Filed: Jun. 6, 2016

(65) Prior Publication Data

US 2016/0356104 A1    Dec. 8, 2016

(30) Foreign Application Priority Data

Jun. 5, 2015   (EP) .................................. 15170833

(51) Int. Cl.
| | |
|---|---|
| F16L 3/08 | (2006.01) |
| E21B 19/16 | (2006.01) |
| E21B 19/07 | (2006.01) |
| E21B 19/10 | (2006.01) |
| E21B 19/06 | (2006.01) |
| F16B 2/10 | (2006.01) |
| F16L 3/10 | (2006.01) |

(52) U.S. Cl.
CPC ............ *E21B 19/161* (2013.01); *E21B 19/06* (2013.01); *E21B 19/07* (2013.01); *E21B 19/10* (2013.01); *F16B 2/10* (2013.01); *F16L 3/1066* (2013.01)

(58) Field of Classification Search
USPC .......................................................... 248/74.1
See application file for complete search history.

(56) References Cited

U.S. PATENT DOCUMENTS

| | | | |
|---|---|---|---|
| 2,491,711 A | 12/1949 | Calhoun | |
| 3,711,000 A | 1/1973 | Reynard et al. | |
| 4,361,940 A | 12/1982 | McFadden | |
| 5,848,647 A * | 12/1998 | Webre ................... | E21B 19/07 166/379 |
| 6,494,273 B1 * | 12/2002 | Martin ................... | E21B 19/06 166/77.1 |
| 7,681,649 B2 * | 3/2010 | Cerovsek .............. | E21B 19/06 166/382 |
| 7,762,343 B2 * | 7/2010 | Sonneveld ............. | E21B 19/10 166/382 |

(Continued)

FOREIGN PATENT DOCUMENTS

| | | |
|---|---|---|
| CN | 203382753 | 1/2014 |
| WO | 2007126319 | 11/2007 |

OTHER PUBLICATIONS

European Search Report, dated Dec. 3, 2015, priority document.
IP Office of Singapore Search Report, dated Nov. 8, 2016, parallel Singapore App 10201604579R.

*Primary Examiner* — Monica E Millner
(74) *Attorney, Agent, or Firm* — Greer, Burns & Crain Ltd.

(57) ABSTRACT

An apparatus to support a tubular member such as pipes, in particular in deep drilling, in particular in the field of oil and gas production, for instance in deep drilling. A plurality of linear actuators for moving clamp elements are orientated with their actuator axis in a cone angle of a sliding surface for the clamp elements. The linear actuators are positioned in the clamp elements.

11 Claims, 5 Drawing Sheets

(56) References Cited

U.S. PATENT DOCUMENTS

| | | | |
|---|---|---|---|
| 8,096,540 B2* | 1/2012 | Claxton | E21B 19/07 269/188 |
| 8,141,923 B2* | 3/2012 | Bouligny | E21B 19/07 294/102.2 |
| 8,720,589 B2 | 5/2014 | Thibodeaux, Jr. et al. | |
| 9,057,225 B2* | 6/2015 | Vierke | E21B 19/07 |
| 9,140,078 B2* | 9/2015 | Angelle | E21B 19/07 |
| 9,291,013 B2* | 3/2016 | Angelle | E21B 21/015 |
| 2007/0163807 A1* | 7/2007 | Lutzhoft | E21B 19/10 175/52 |
| 2008/0216999 A1 | 9/2008 | Halse | |
| 2013/0008641 A1 | 1/2013 | McIntosh et al. | |
| 2013/0153213 A1* | 6/2013 | Angelle | E21B 19/24 166/250.01 |
| 2014/0345879 A1 | 11/2014 | Angelle et al. | |
| 2015/0021946 A1 | 1/2015 | Vierke et al. | |
| 2015/0034335 A1 | 2/2015 | Brown et al. | |
| 2015/0090463 A1 | 4/2015 | Gupta et al. | |

* cited by examiner

APPARATUS TO SUPPORT A TUBULAR MEMBER

CROSS-REFERENCES TO RELATED APPLICATIONS

This application claims the benefit of the European patent application No. 15170833.6 filed on Jun. 5, 2015, the entire disclosures of which are incorporated herein by way of reference.

BACKGROUND OF THE INVENTION

The invention relates to an apparatus to support a tubular member such as pipes, in particular, in the field of oil and gas production.

In the drilling industry, it is the usual practice to hoist various types of pipes, such as drill systems and production tubing, with various elevators of different capacities. The internal diameters and configurations of the elevators are specifically dressed for precise interfitting relation with the tool joints of the pipes to be handled.

An elevator enabling the supporting of pipes having different outer diameters is shown in U.S. Pat. No. 4,361,940 A. The apparatus has a carrying structure defining a central opening for receiving a pipe. In order to hold the pipe, movable clamp elements are provided. The clamp elements are moved by vertical cylinder-piston arrangements that are positioned in the carrying structure and that are acting on the clamp elements by horizontal orientated levers.

In CN 203 382 753 a further apparatus for supporting tubular members is shown. Its clamp elements are also moved by vertical cylinder-piston arrangements positioned in the body acting on the clamp elements by horizontal levers. The clamping elements have a wedge-like shape and moved along a carrying structure surface that is inclined to the vertical axis.

In U.S. Pat. No. 7,762,343 B2 a further apparatus to support tubular members is shown having clamp elements. The clamp elements are moved by vertical cylinder-piston arrangements positioned in a carrying structure that act on the clamp elements by horizontal levers.

In U.S. Pat. No. 8,720,589 B2 an apparatus for holding pipes via positive form fit is shown. Pilotable retainers of a carrying structure for holding a pipe are actuated by cylinder-piston arrangements which are positioned in the carrying structure and acting on the clamp elements by horizontal levers.

SUMMARY OF THE INVENTION

In view of the above, it is an object of an embodiment of the invention to provide at least one alternative to the apparatus described above, which provides an apparatus of the abovementioned general type, with a more effective application of clamping force, so that the apparatus can correspondingly apply a higher clamping force and/or be designed with a lighter weight and/or reduced power input, and that provides a simpler, more economical and more robust construction of a clamping mechanism.

In the present application, the term "tubular member" will be used generally and broadly to refer to any elongated member that is to be releasable held in the apparatus, which may specifically include a pipe, a tube, a solid or hollow rod, a tool shaft or shank, or any other elongated member.

According to the invention, an apparatus to support a tubular member such as pipes, in particular, in the field of oil and gas production, comprises:

a carrying structure that can be mechanically attached to a handling apparatus extends annularly around a central opening along an axis and has an inner circumferential surface bounding that central opening, wherein the inner circumferential surface tapers conically at a cone angle relative to the axis, a plurality of clamp elements that are arranged movably relative to that carrying structure in the central opening, wherein each of that clamp elements has an inclined surface on a radially outer side thereof, the inclined surface is inclined at the cone angle relative to the axis and is configured and arranged to slide along the inner circumferential surface, and wherein each of that clamp elements has a clamp surface being parallel to the axis, and a plurality of linear actuators, wherein each of the linear actuators, respectively, has first and second actuator components that can be driven linearly relative to one another along an actuator axis that is inclined at the cone angle relative to that axis, wherein the first component is connected to the carrying structure, and wherein the second component is connected to a respective one of the clamp elements, wherein both the first and the second components are positioned in a recess of the inclined surface of the respective clamp element.

The above described arrangement provides a highly precise and highly loadable and robust guidance and actuation of the clamp elements within and relative to the carrying structure. Because the linear actuators are tilted along the cone angle and they are positioned in the clamp elements, they can apply an optimal stroke or linear actuation force and a resulting optimal radial clamping or holding force. Auxiliary elements, such as levers or the like, in order to connect the linear actuators with the clamp elements, can be omitted. Namely, the linear actuators apply the actuation force, respectively, to each clamp element along the direction of the cone angle, and the respective clamp element slides along the conically tapering inner circumferential surface of the carrying structure which is also sloped correspondingly at this cone angle. Thus, the applied actuation force smoothly and optimally drives the sliding motion of the clamp elements along the cone angle, whereby the radial motion component effectuates the clamping force of the clamp elements onto the tubular member extending longitudinally through the central opening of the elevator. Furthermore, the above arrangement strongly reduces or even prevents a twisting or tilting of the linear actuators. Therefore, the linear actuators can be designed and constructed with a lighter weight and/or to apply a higher clamping force and/or to require a reduced input actuation power. Additionally, as the linear actuators are positioned in the slips, the carrying structure can be made more tightly arranged, this enabling a bigger central opening and thus the supporting of bigger pipes by an unchanged outer carrying structure extension. It should be noted that the apparatus 1 according to the invention is not limited to lifting and lowering operations. An exemplary alternative application is using the apparatus 1 according to the invention to hold and press tubular elements of pipelines against each other in order to create a weld joint. Thus, the apparatus 1 according to the invention can also be part of a welding machine. As a part of a welding machine, two apparatus according to the invention can be provided, wherein each apparatus holds one tubular member.

According to an embodiment, the linear actuators are cylinder-piston-arrangements, wherein the first components are the cylinders and the second components are the pistons which are movable guided in the cylinders along the actuator axis and that are attached to the clamp elements by a holding element that extends through the piston rod along the actuator axis. Cylinder-piston-arrangements such as hydraulic cylinder-piston-arrangements enable reliable, robust actuation and the applying of high actuation forces. As the holding element extends through the piston rod, a replacement of the clamp elements is facilitated. Basically, only the holding element has to be removed to loosen the connection between the cylinder-piston arrangement and the respective clamp element.

In order to ensure that the cylinders are in their desired assembly positions, each cylinder can have a positive form fit element which engages with a counter element of the carrying structure. Further on, the form fit engagement prevents a relative movement of the cylinders.

Additionally, the cylinders can be secured to the carrying structure by screws being in thread engagement with the positive form fit elements.

Preferably, each piston divides the respective cylinder space into a first pressure chamber and in a second pressure chamber. The pressure chambers have preferably the same volume and the same stroke length, thus enabling an easy actuation.

The actuation of the cylinder-piston-arrangements can be more facilitated, if the cylinder-piston-arrangements are connected in series such that the fluid pressed out of a first pressure chamber of one cylinder-piston arrangement is pressed into the second pressure chamber of the subsequent cylinder-piston-arrangement and vice versa. Due to such a Master-Slave-Actuation, a mechanical mechanism in order to connect the clamp elements can be omitted. All cylinder-arrangements can be actuated by on fluid pump and by just one 4-port/2-way valve, as the fluid is fed successively through all cylinder-piston-arrangements.

The pressure chambers of each cylinder-piston-arrangement can be connected with each other by a bypass conduit having a constricted opening. By means of this, first a synchronization of the clamp elements in axial motion and radial motion can be automatically achieved in case the cylinder-piston-arrangements are out of synchronization. Thus, a reset function is provided. Second, via the bypass conduit, fluid leakage is compensated automatically. Due to the constricted opening relative to fluid conduits led to/from the pressure chambers, totally bypassing a cylinder-piston arrangement is prevented.

In one embodiment, a valve element is positioned in each bypass conduit preventing a fluid flow through the bypass conducts when the clamping elements are moved down. By means of this, a bypass flow is prevented during lowering the clamp elements and such during grabbing the tubular member. Thus, it is ensured that a necessary holding force/work pressure can be applied to the clamp elements in order to hold the tubular member. Additionally, due to this orientation of the valve elements it is ensured that the clamp elements are starting at the same upper level before they are moved down, thus enabling a centering of the tubular member to be hold. A preferred valve element is a check valve.

However, in another embodiment, in each bypass conduit a valve element is positioned preventing a fluid flow through the bypass conducts when the clamping elements are lifted up. By means of this, a kind of pressure relief is established during lowering the clamp elements as pressure fluid can bypass the respective cylinder-piston-arrangement. A preferred valve element is a check valve.

In order to create a compact cylinder, it is preferred to use the whole stroke length in a lowering operation and in a handling operation. In order to enable a fluid flow to pressure sides of the pistons in their end positions, each piston can have at least one chamfer on its outer circumferential surface providing a minimum volume of a pressure chamber into which the fluid can be pumped.

For safety reasons it is advantageous when first and second signals are generated representing the clamp elements being in the lowered position or in the lifted position. Preferably, two switch- or sensor-like elements are dedicated to each clamp element, wherein one switch generates a signal when the respective clamp element is down and the other switch generates a signal when the respective clamp element is up.

BRIEF DESCRIPTION OF THE DRAWINGS

In the following, a preferred embodiment of the invention is described with reference to the following figures.

DETAILED DESCRIPTION OF THE PREFERRED EMBODIMENTS

Figure 1:
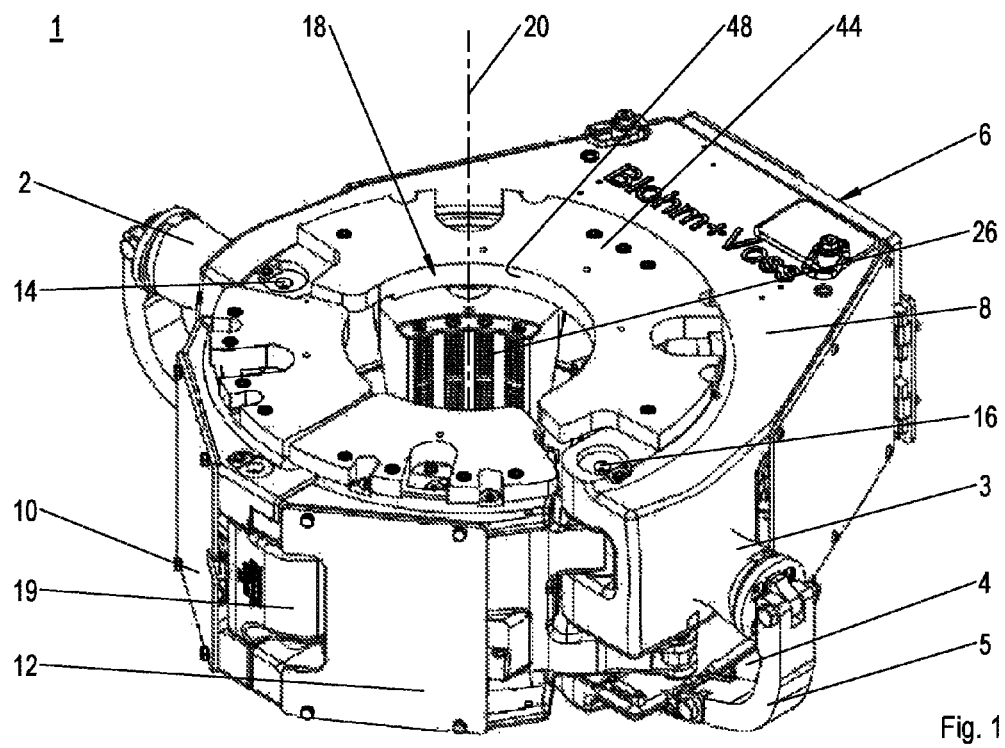
FIG. 1 shows a perspective view of an apparatus according to the invention in a closed position.
Figure 2:
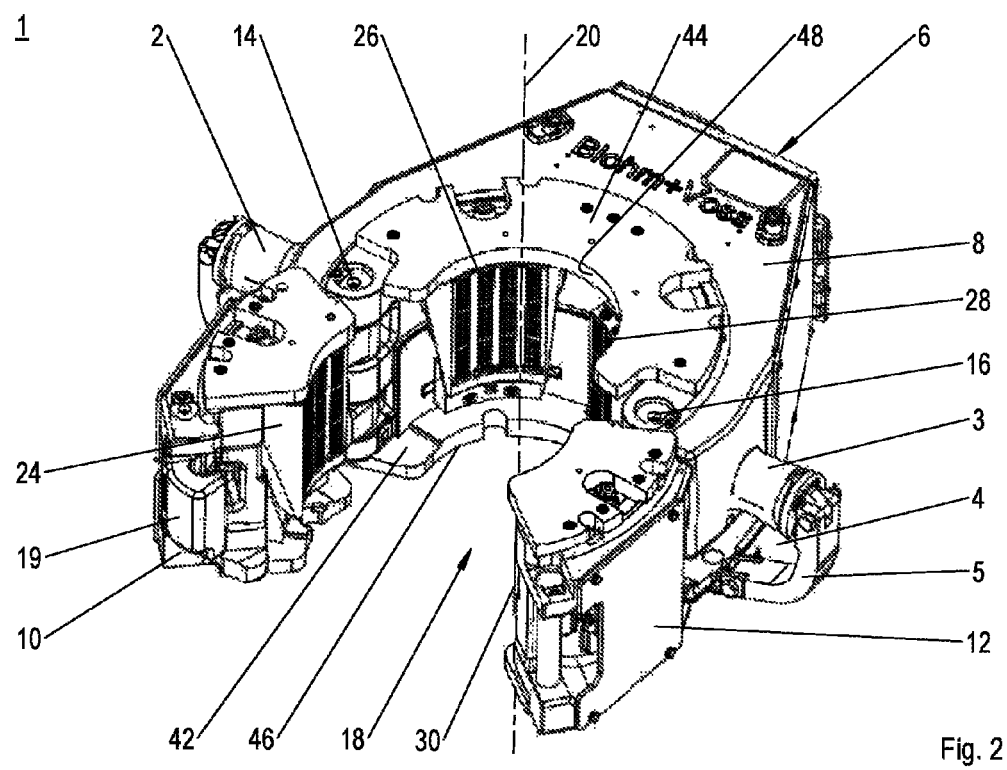
FIG. 2 shows a perspective view of an apparatus according to the invention in an opened position.

In FIGS. 1 and 2, an example of an apparatus 1 according to the invention is shown in its closed position (FIG. 1) and in its opened position (FIG. 2). The apparatus 1 is used for lifting, lowering and holding tubular members such as pipes on off- and onshore oil or gas drilling platforms. In the drilling technology, such an apparatus 1 is called an elevator, in general. It should be noted that the apparatus 1 according to the invention is not limited to lifting and lowering operations. An exemplary alternative application is using the apparatus 1 according to the invention to hold and press tubular elements of pipelines against each other in order to create a weld joint. Thus, the apparatus 1 according to the invention can also be part of a welding machine In order to attach the apparatus 1 mechanically to a non-shown handling or lifting system of the drilling platform, the apparatus has two outer ear-like retainer elements 2, 3 on opposite sides. Each retainer element defines an opening 4 for receiving connection bars and the like of the lifting system. Preferably, the retainer elements have pivotable locking arms 5 in order to open and close the openings circumferentially.

The apparatus 1 has a carrying structure 6 comprising an elevator body 8 and two doors 10, 12 that are pivotably connected to the elevator body 8 on opposite sides by hinges 14, 16. The carrying structure 6 extends annularly around a central opening 18 along an axis. The doors 10, 12 can be moved relative to the elevator body 8 between the closed positioned (FIG. 1) and the opened position (FIG. 2). In the closed position, the doors 10, 12 are locked by a common latch 19 and by a not shown locking device that prevents an unintentional opening of them. In the opened position, the central opening 18 is opened circumferentially and a tubular member can be inserted in the central opening 18 radially to the axis 20 of the central opening 18. The doors 10, 12 are so attached to the elevator body 8 that the central opening 18 can be opened over a peripheral angle of 180°. Thus, each door 10, 12 extends over a circumferential area of 60°. The movement of the doors 10, 12 and of the locking device is done preferably hydraulically.

In the central opening 18 on inner circumferential surfaces 22 of the carrying structure 6, a plurality of clamp elements 24, 26, 28, 30 are arranged movably relative to that carrying structure 6 in the central opening 18. In the shown embodiment, four identical clamp elements 24, 26, 28, 30 are provided. The clamp elements 24, 26, 28, 30 are evenly distributed in a circumferential direction. Thus, two clamp elements 26, 28 are guided on the carrying structure 6 and one clamp element 24, 30 is guided on one of the doors 10, 12. However, it should be noted that fewer or more clamp elements 24, 26, 28, 30 can be provided.

The clamp elements 24, 26, 28, 30 are so-called slips and can be moved between a lowered position and a lifted position. In the lifted position, the clamp elements 24, 26, 28, 30 are moved radially outwards in order to introduce or remove a tubular member. In the lowered position, the clamp elements 24, 26, 28, 30 are moved radially inwards in order to grab and hold the tubular member for a following lowering or lifting operation. The lowering and lifting of the clamp elements 24, 26, 28, 30 is done by linear actuators 32, 34, 36, 38, in particular by hydraulic cylinder-piston-arrangements that are positioned in a recess 40 of the clamp elements 24, 26, 28, 30. A more detailed explanation of the cylinder-piston-arrangements 32, 34, 36, 38, follows in FIGS. 3, 4 and 5.

In order to protect the clamp elements 24, 26, 28, 30 against unintended contact with the tubular member to be handled, guideplates 42, 44 are provided on the lower side and the upper side of the carrying structure 6. As shown in FIGS. 1 and 2, on each elevator side three guideplates 42, 44 are provided, wherein the guideplates on the doors 12 form a peripheral angle of 60° each and the guideplates on the elevator body 8 form a peripheral angle of 180° each. The guideplates 42, 44 have concave inner surfaces 46, 48 and extend radially over the clamp elements 24, 26, 28, 30 in their lifted position. In the closed position of the carrying structure 6, the concave inner surfaces 46, 48 form an upper inner circumferential guide surface and a lower inner circumferential guide surface. By means of the upper and the lower circumferential guide surfaces 46, 48, the tubular element to be handled will be centered in the central opening 18 before they are grabbed by the clamp elements 24, 26, 28, 30.

Figure 3:
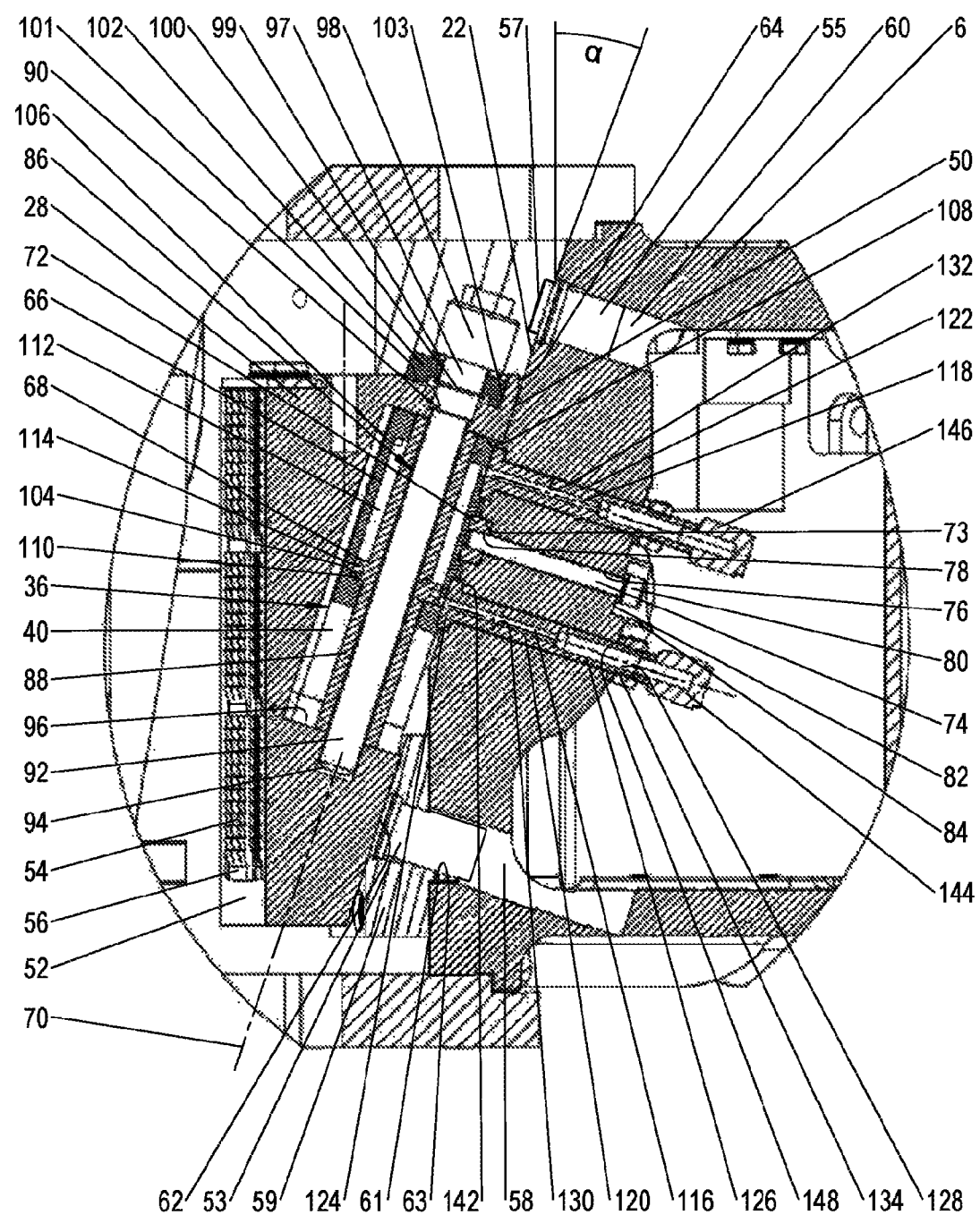
FIG. 3 shows a cross section through a clamp element and its cylinder-piston-arrangement.

In FIG. 3, a cross section through an exemplary clamp element 28 is shown. In particular, FIG. 3 shows a cross section though the right clamping element 28 according to FIG. 2. However, it is mentioned that the following description is not limited to this one clamping element 28, but represents all clamping elements 24, 26, 28, 30.

As can be seen in FIG. 3, the inner circumferential surface 22 of the carrying structure 6 bounding that central opening 18 tapers conically at a cone angle α relative to the axis 20.

The clamp element 28 has a wedge-like cross section. It has an inclined surface 50 on a radially outer side thereof, the inclined surface 50 is inclined at the cone angle α relative to the axis 20 and is configured and arranged to slide along the inner circumferential surface 22. The recess 40 for receiving one of the cylinder-piston-arrangements 32, 34, 36, 38 is provided in the inclined surface 50.

On a radially inner side, the clamp element 28 has a clamp surface 52 being parallel to the axis 20. In order to enhance the contact with a tubular element to be handled, a plurality of wedges 54 is provided. The wedges 54 are supported on carriers 56 that are releasable secured to the clamp surface 52 in a direction parallel to the axis 20.

In order to detect the position of one clamp element 28, a lower switch 53 and an upper switch 55 are provided. The switches 53, 55 are located in a lower bore 58 and in an upper bore 60 of the carrying structure 6. In order to facilitate the manufacturing of the carrying structure 6, an adapter element 59 can be positioned in the area of the lower switch 53 between the clamp element 28 and the carrying structure 6 having a wedge-like cross section. By means of this, the carrying structure 6 can have a lower vertical surface area, as the inclined surface 22 is formed partially by the wedge-like adapter element 59. In order to secure the adapter element 59 to the carrying structure 6, a rear projection 61 of the adapter element 59 can be received in a corresponding counter recess 63 of the carrying structure 6. When the adapter element 59 is used, the lower bore 58 extends through the adapter element 59 and the switch 53 is positioned at least partially in the adapter element 59.

The switches 53, 55, for instance hydraulic switches, extend with a contact section 57 out of the bores 58, 60 over the internal circumferential surface 22 in the central opening 18 and are activated by actuation surfaces 62, 64 of the clamp element 28. The actuation surfaces 62, 64 can have inclined surfaces areas relative to the inclined surface 50 of the clamp element 28 which are positioned on opposite ends of the clamp element 28. As can be seen in FIG. 2, when the clamp element 28 is lowered, the lower actuation surface 62 is overlapping the lower bore 58, thus the lower switch 53 is activated and a signal is generated that the clamp element 28 is in its lowered position. When the clamp element 28 is lifted, the upper actuation surface 62 is contacting the upper switch 55, thus the upper switch is activated and a signal is generated that the clamp element 28 is in its lifted position.

The cylinder-piston arrangement 36 has a cylinder 66 and a piston 68 that can be driven linearly relative to one another along an actuator axis 70 that is inclined at the cone angle α relative to that axis 20. The cylinder 66 is attached to carrying structure 6, and the piston 68 is attached to the clamp element 28. Both, the cylinder 66 and the piston 68 are positioned in the recess 40 of the inclined surface 50 of the clamp element 28.

The attachment of the cylinder 66 to the carrying structure 6 is done by a cylinder-like positive fit element 72 that is fixed to an outer surface section of the cylinder 68 and engages into a counter recess 73 of the carrying structure 6 in its inner circumferential surface 22. Preferably, the positive fit element 72 is welded to an outer circumferential surface section of the cylinder 66. Additionally, the cylinder 68 is attached to the carrying structure 6 by a screw 74. A screw 74 extends through a through hole 76 of the carrying structure 6 from the rear relative to the clamp element 28 and is in threaded engagement with an internal screw thread 78 of the positive form fit element 72. Preferably, the through hole is orientated perpendicular to the actuator axis 70. When tightening the screw 74, the screw 74 is turned into the internal screw thread 78 and pressed with its head 80 against a back-facing surface 82. In order to protect the screw head 80, the back-facing surface 82 is surrounded by a wall 84 extending over the head 80.

The attachment of the piston 68 to the clamp element 28 is done by an elongated holding element 86 that extends through a piston rod 88 supporting the piston 68 along the actuator axis 70. The holding element 86 is, in the shown embodiment, a stud-bolt that is fed through an upper bore 90 of the recess 40 of the clamp element 28 into the recess 40 and that is received with its foot 92 in a corresponding cavity 94 in a recess ground 96. The holding element 86 has an upper external thread section 97 by which it is in threaded engagement with an internal thread of the upper bore 90. In order to avoid a loosing of the holding element 86, a ring-like locking device 99 is positioned between its head 98 and a housing 102 through which the holding element 98 is fed outside the recess 40. The housing 102 is carried by an outer surface 101 rendering the upper bore 90 and in contact with a shoulder 103 extending perpendicular to the outer surface 101. In order to enable a fast and easy disassembly of the holding element 86, the housing 102 and the locking device 99 are held together in a dissembled state by a locking ring 100 that is in engagement with a non-shown circumferential notch of the holding element 86 that is covered by the housing 102 below the head 98.

The piston rod 88 extends through both face sides 104, 106 of the cylinder 66 and contacts both the recess ground 96 and an opposite recess ceiling 108. Thus, the piston rod 88 is fixed radially by the holding element 72 and axially by its contact with the recess ground 98 and the recess ceiling 108.

The piston 68 is an integral section of the piston rod 88. It has the shape of a ring and divides an internal space of the cylinder 68 in a lower pressure chamber 110 and in an upper pressure chamber 112. As the clamp element 28 is shown in the down position, the lower pressure chamber 110 is minimized. In order to avoid leakage between the pressure chambers 110, 112, the piston 68 supports a non-illustrated sealing ring in a respective outer circumferential notch 114.

Both pressure chambers 110, 112 have the same inner diameter and the same stroke length. Thus, they have the same volume in total. The lower pressure chamber 110 is pressurized in order to lift up the clamp element 28. The upper pressure chamber 112 is pressurized in order to lower the clamp elements 28.

In order to feed the pressure fluid, in particular hydraulic oil, into the pressure chambers 110, 112 and out of the pressure chambers 110, 112, respectively, two fluid conduits 116, 118 are provided. Both conduits 116, 118 are positioned such in the carrying structure 6 that they enter the pressure chambers 110, 112 close to cylinder's end faces 104, 106, in particular directly at the level of the cylinder's end faces 104, 106.

The conduits 116, 118 are provided in pipe element 120, 122 that has a longitudinal through channel as a conduit, a broadened foot section 124 and a head section 126 provided with an external thread 128. The pipe elements 120, 122 are received in through bores 130, 132 extending through the carrying structure 6 parallel to the through hole 76 of the screw 74 for fixing the cylinder 66 to the carrying structure 6. The pipe elements 120, 122 are engaged with their foot sections 124 between the cylinder 66 and the carrying structure 6 and are secured to the carrying structure 6 by nuts 134 being screwed on their external thread 128. The pipe elements 120, 122 are welded with their foot sections 124 to outer circumferential surface sections of the cylinder 66. Thus, even in the unlikely event of damage to the screw 74, the cylinder 66 is reliably fixed to the carrying structure 6 by the pipe elements 120, 122. In order to achieve a pre-alignment of the pipe elements 120, 122 and cylinder channels 136, 138, the carrying structure 6 has in its opposite surface sections depressions 140, 142 that correspond to the broadened foot 124. The mechanical connection of non-shown external fluid lines to the fluid conduits 116, 118 is done by adapter elements 144, 146 which are in threaded engagement with internal threads 148 of the pipe elements 120, 122. The activating of the clamp element 28 and the external fluid lining will be described with respect to FIGS. 4 and 5.

Figure 4:
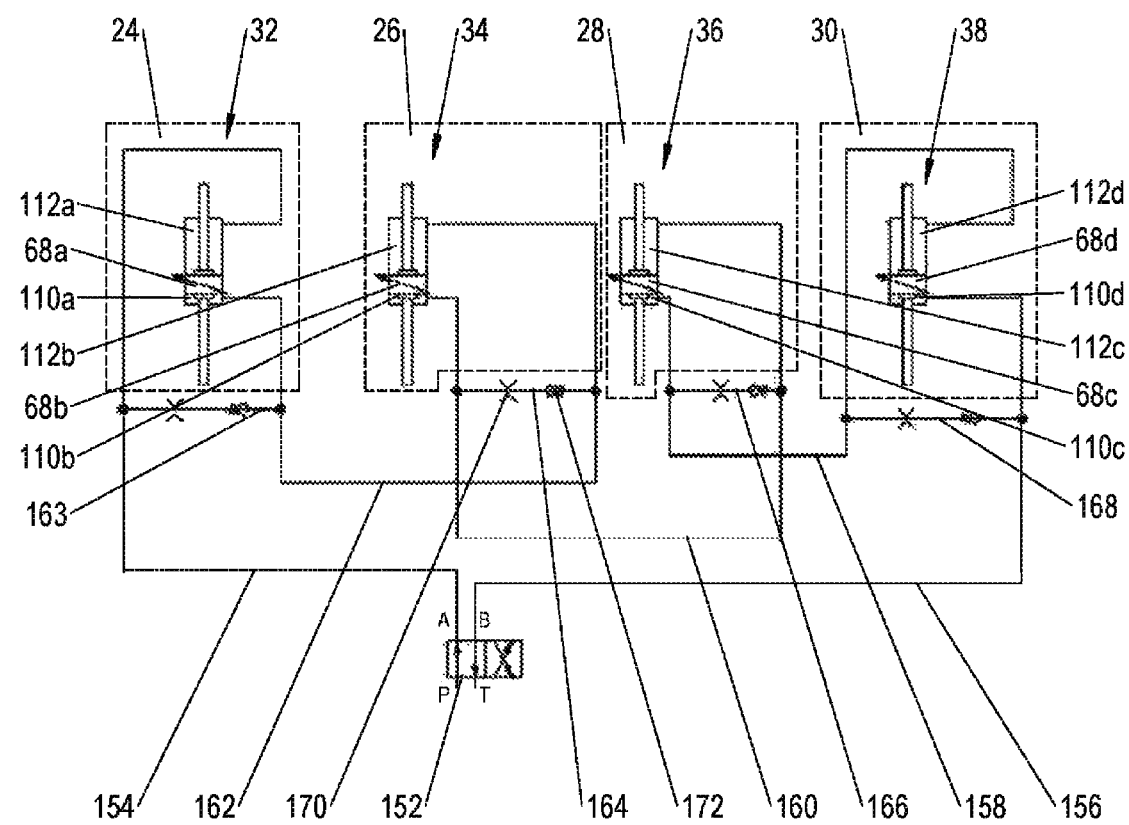
FIG. 4 shows a connection scheme of four cylinder-piston-arrangements when lowered.

As shown in FIG. 4, each clamp element 24, 26, 28, 30 has its own cylinder-piston arrangement 32, 34, 36, 38. The cylinder-piston arrangements 32, 34, 36, 38 are connected in series, such that the fluid pressed out of a lower pressure chamber 110 of one cylinder-piston arrangement 32, 34, 36, 38 is pressed into the upper pressure chamber 112 of the subsequent cylinder-piston-arrangement 32, 34, 36, 38 and vice versa. The cylinder-piston-arrangements 32, 34, 36, 38 at the ends are connected to a joined valve element 152.

In the shown embodiment, the valve element 152 is a 4-port/2-way valve by which a fluid connection can be opened and closed to a fluid pump and a fluid tank. It has the access ports A, B, P and T. From the access port A a fluid line 154 is fed directly to the upper pressure chamber 112a of left cylinder-piston-arrangement 24, from the access port B a fluid line 156 is fed directly to the lower pressure chamber 110d of the right cylinder-piston-arrangement 38. The access port P is connected with the pump and the access port T is connected with a tank.

The upper pressure chamber 112d of the right cylinder-piston arrangement 38 is connected by a fluid line 158 with the lower pressure chamber 110c of the adjacent cylinder-piston arrangement 36 on its left side. The upper pressure chamber 112c of this cylinder-piston arrangement 36 is connected by a fluid line 160 with the lower pressure chamber 110c of the adjacent cylinder-piston arrangement 34 on its left side. The upper pressure chamber 112c of this cylinder-piston arrangement 34 is connected by a fluid line 162 with the lower pressure chamber 110a of the adjacent cylinder-piston arrangement 32 on its left side, i.e., the left cylinder-piston-arrangement 32 that is in direct connection with the access port A of the valve.

As shown in FIG. 4, the pistons 68a, 68b, 68c, 68d of all cylinder-piston-arrangements are lowered. Thus, the lower pressure chambers 110a, 110b, 110c, 110d are minimized and the clamp elements 24, 26, 28, 30 are lowered and holding a tubular element respectively.

In order to lift up the clamp elements 24, 26, 28, 30, the valve element 152 is brought in its shown first work position in which the pump is connected with the access port B, and the access port A is connected with the tank. As a consequence, the fluid is pumped into the lower pressure chamber 110d of the right cylinder-piston-arrangement 38 and its piston 68d is lifted up. By means of this, its upper pressure chamber 12d is minimized and the fluid in the upper chamber 112d will be pressed into the lower pressure chamber 110c of the subsequent cylinder-piston-arrangement 36 via the fluid line 160. As the cylinder-piston-arrangements 32, 34, 36, 38 are connected in series, this characteristic repeats between the subsequent cylinder-piston-arrangements 36, 34 and 34, 32. Finally the piston 68a of the left cylinder-piston-arrangement 32 will be lifted and the fluid in its upper pressure chamber 112a is fed to the tank. As the pressure fluid is incompressible, all pistons 68a, 68b, 68c, 68d and thus all clamp elements 28 are lifted simultaneously.

Figure 5:
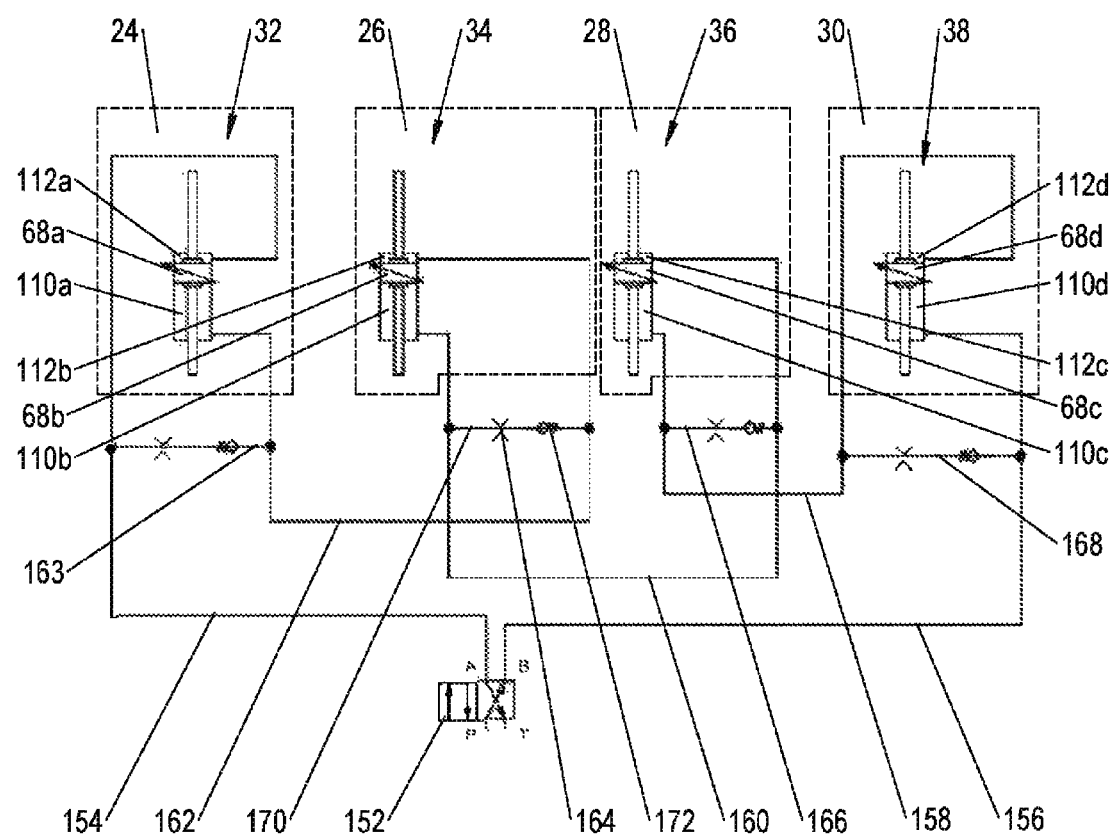
FIG. 5 shows a connection scheme of four cylinder-piston-arrangements when lifted.

With reference to FIG. 5, in order to lower the clamp elements 24, 26, 28, 30, the valve element 152 is brought in its second work position in which the pump is connected with the access port A, and the access port B is connected with the tank. As a consequence, the fluid is pumped into the upper pressure chamber 112a of the left cylinder-piston-arrangement 32 and its piston 68a is lowered. By means of this, its lower pressure chamber 110a is minimized and the fluid in the lower pressure chamber 110a will be pressed into the upper pressure chamber 112b of the subsequent cylinder-piston-arrangement 34 via the fluid line. As the cylinder-piston-arrangements 32, 34, 36, 38 are connected in series, this characteristic repeats between the subsequent cylinder-piston-arrangements 34, 36 and 36, 38. Finally the piston 68d of the right cylinder-piston-arrangement 38 will be lowered and the fluid in its lower pressure chamber 110d is fed to the tank. As the pressure fluid is incompressible, all pistons 68a, 68b, 68c, 68d and thus all clamp elements 28 are lowered simultaneously.

With reference to FIGS. 4 and 5, each cylinder-position-arrangement 32, 34, 36, 38 comprises a bypass conduit 162, 164, 166, 168 connecting its pressure chambers 110a, 112a; 110b, 112b; 110c, 112c; 110d, 112d with each other. The bypass conduits 163, 164, 166, 168 enables a reset of all cylinder-piston-arrangements 32, 34, 36, 38 in the case of a non-simultaneously behavior, and a leakage compensation. Each bypass conduits 162, 164, 166, 168 has a constricted opening 170 that has a smaller internal diameter than the fluid lines 154, 156, 158, 160. By means of this, it is ensured in general that the fluid is fed into one of the pressure chambers 110a, 112a; 110b, 112b; 110c, 112c; 110d, 112d and not only through the bypass conduits 163, 164, 166, 168.

Additionally, in order to enable a reset of the cylinder-piston-arrangement 32, 34, 36, 38 and leakage compensation only during the lifting or the lowering operation of the clamp elements 24, 26, 28, 30, in each bypass conduit 163, 164, 166, 168 a valve element 172 can be provided. In the shown embodiment, the valve elements 172 are check valves and are such orientated that a fluid connection through the bypass conduit 163, 164, 166, 168 is blocked during a lowering operation of the clamp elements 24, 26, 28, 30. Thus, in the shown embodiment a reset of the cylinder-piston-arrangements 32, 34, 36, 38 and leakage compensation can only apply during a lifting operation.

Figure 6:
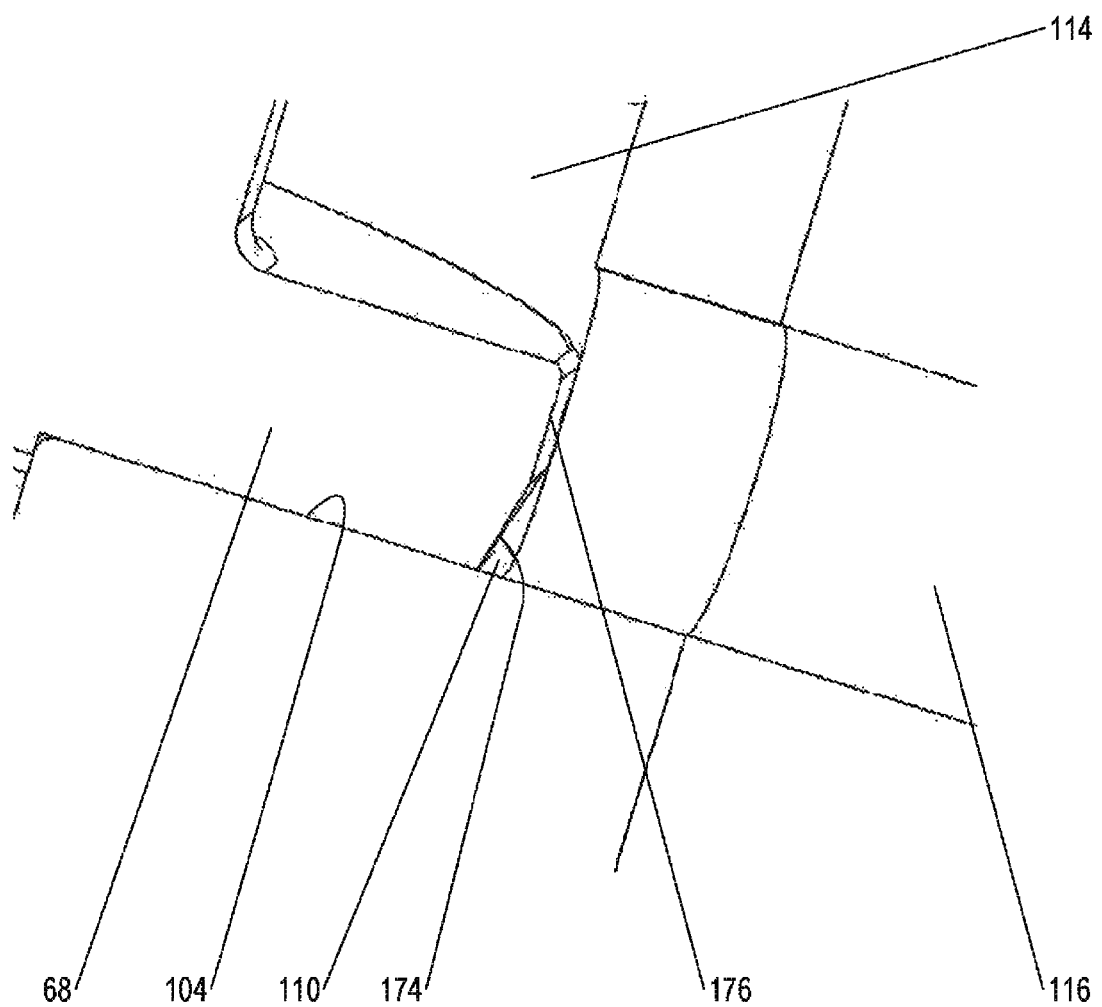
FIG. 6 shows a cross section through a piston of one of the cylinder-piston-arrangements.

In FIG. 6 a detail of the pistons 68 is shown. In order to enable an acting of the fluid on the pistons 68 when they are in their end positions, i.e., in contact with the cylinder's end faces 104, 106, each piston 68 has two opposite chamfers 174 on its outer circumferential surface 176. The chamfer which is orientated to the upper pressure chamber is not illustrated in FIG. 5 for clarity reasons. The chamfers 174 define a minimum pressure chamber volume 178 and enable an entering of the fluid through the fluid conduits 116, 118 in the pressure chambers 110, 112.

Disclosed is an apparatus to support a tubular member such as pipes, in particular in the field of oil and gas production, for instance in deep drilling, wherein a plurality of linear actuators for moving clamp elements are orientated with their actuator axis in a cone angle of a sliding surface for the clamp elements, and wherein the linear actuators are positioned in the clamp elements.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE LIST 1 apparatus
2 retainer element
3 retainer element
4 opening
5 locking arm
6 carrying structure
8 elevator body
10 door
12 door
14 hinge
16 hinge
18 central opening
19 latch
20 axis
22 inner circumferential surfaces 22
24 clamp elements
26 clamp elements
28 clamp elements
30 clamp elements
32 linear actuators/cylinder-piston-arrangement
34 linear actuators/cylinder-piston-arrangement
36 linear actuators/cylinder-piston-arrangement
38 linear actuators/cylinder-piston-arrangement
40 recess
42 guideplate
44 guideplate
46 concave inner surface
48 concave inner surface
50 inclined surface
52 clamp surface
53 switch
54 wedge
55 switch
56 carrier
57 contact section
58 bore
59 adapter element
60 bore
61 projection
62 actuation surface
63 depression
64 actuation surface
66 cylinder
68, 68a, 68b, 68c, 68d piston
70 actuator axis
72 positive form fit element
73 counter recess
74 screw
76 through hole
78 internal screw thread
80 head/screw head
82 back-facing surface
84 wall
86 holding element
88 piston rod
90 upper bore
92 foot
94 cavity
96 recess ground
97 thread section
98 head
99 locking device
100 locking ring
101 outer surface
102 housing 103 shoulder
104 face side/end face
106 face side/end face
108 recess ceiling
110 110a, 110b, 110c, 110d lower pressure chamber
112 112a, 112b, 112c, 112d upper pressure chamber
114 circumferential notch
116 fluid conduit
118 fluid conduit
120 pipe element
122 pipe element
124 foot section
126 head section
128 external thread
130 through bore
132 through bore
134 nut
136 cylinder channel
138 cylinder channel
142 depression
144 adapter element
146 adapter element
148 internal thread
152 valve element
154 fluid line
156 fluid line
158 fluid line
160 fluid line
162 fluid line
163 bypass conduit
164 bypass conduit
166 bypass conduit
168 bypass conduit
170 constricted opening
172 valve element/check valve
174 chamfer
176 outer circumferential surface
178 minimum pressure chamber volume
α cone angle

The invention claimed is:

1. An apparatus to support a tubular member, comprising:
a carrying structure configured to be mechanically attached to a handling apparatus, the carrying structure extending annularly around a central opening along an axis and having an inner circumferential surface bounding the central opening, wherein the inner circumferential surface tapers conically at a cone angle relative to the axis,
a plurality of clamp elements arranged movable relative to the carrying structure in the central opening, wherein each clamp element of the plurality of clamp elements has an inclined surface on a radially outer side thereof, the inclined surface being inclined at the cone angle relative to the axis and being configured and arranged to slide along the inner circumferential surface, and wherein each clamp element of the plurality of clamp elements has a clamp surface arranged parallel to the axis, and
a plurality of linear actuators for lowering and lifting of the plurality of clamp elements, wherein the plurality of linear actuators are hydraulic cylinder-piston-arrangements, and wherein each linear actuator of the plurality of linear actuators respectively has first and second actuator components that are configured to be driven linearly relative to one another along an actuator axis that is inclined at the cone angle relative to the axis, wherein the first actuator component is attached to the carrying structure, and wherein the second actuator component is attached to a respective one of the clamp elements, wherein both the first and the second actuator components are positioned in a recess of the inclined surface of the respective one of the plurality of clamp elements.

2. The apparatus according to claim 1, wherein said first components are cylinders and the second components are pistons which are movably guided in the cylinders along the actuator axis and that are attached to the plurality of clamp elements by a holding element that extends through a piston rod along the actuator axis.

3. The apparatus according to claim 2, wherein the cylinders each have a positive form fit element which engages with a counter element of the carrying structure.

4. The apparatus according to claim 3, wherein the cylinders are secured to the carrying structure by screws being in threaded engagement with the positive form fit elements.

5. The apparatus according to claim 2, wherein the pistons each divide a space of a different one of the cylinders into a first pressure chamber and in a second pressure chamber.

6. The apparatus according to claim 5, wherein the cylinder-piston-arrangements are connected in series such that fluid pressed out of the first pressure chamber of one cylinder-piston arrangement is pressed into the second pressure chamber of a subsequent cylinder-piston-arrangement and vice versa.

7. The apparatus according to claim 5, wherein the pressure chambers of each cylinder-piston-arrangement are connected with each other by a bypass conduit having a constricted opening.

8. The apparatus according to claim 7, wherein a valve element is positioned in each bypass conduit preventing a fluid flow through the bypass conduits when the plurality of clamp elements are moved down.

9. The apparatus according to claim 7, wherein in each bypass conduit a valve element is positioned preventing a fluid flow through the bypass conduits when the plurality of clamp elements are lifted up.

10. The apparatus according to claim 5, wherein each piston has chamfers on its outer circumferential surface providing a minimum volume of each pressure chamber when the piston is in one of its end positions.

11. The apparatus according to claim 1, further comprising a signal generating mechanism to generate a first signal when at least one of the plurality of clamp elements is in a lowered position and to generate a second signal when at least one of the plurality of clamp elements is in a lifted position.

* * * * *